No. 739,005. PATENTED SEPT. 15, 1903.
D. C. JACKSON.
POWER DRIVEN MACHINERY.
APPLICATION FILED FEB. 16, 1903.
NO MODEL. 5 SHEETS—SHEET 1.
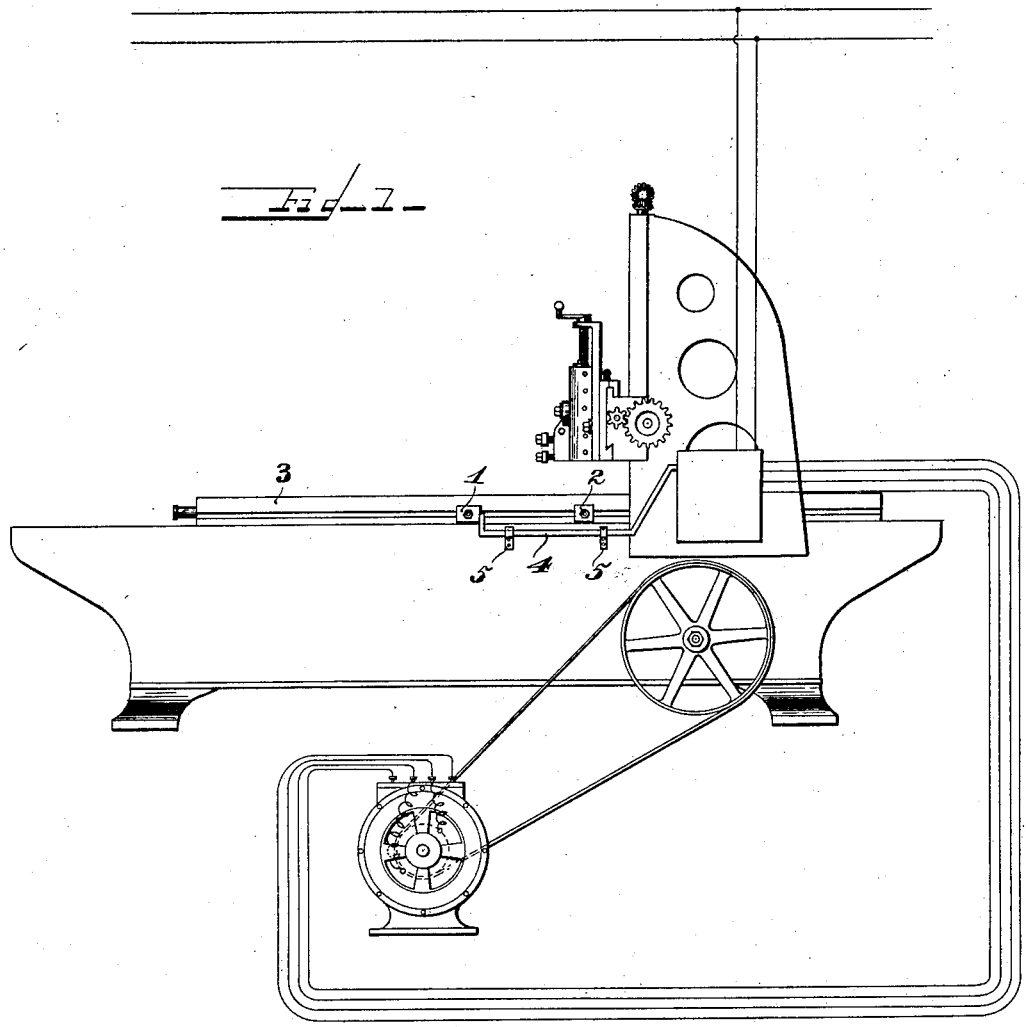
Witnesses:
Leonard W. Novander.
Charles J. Schmidt.
Inventor
Dugald C. Jackson.
By Charles A. Brown
Attorneys

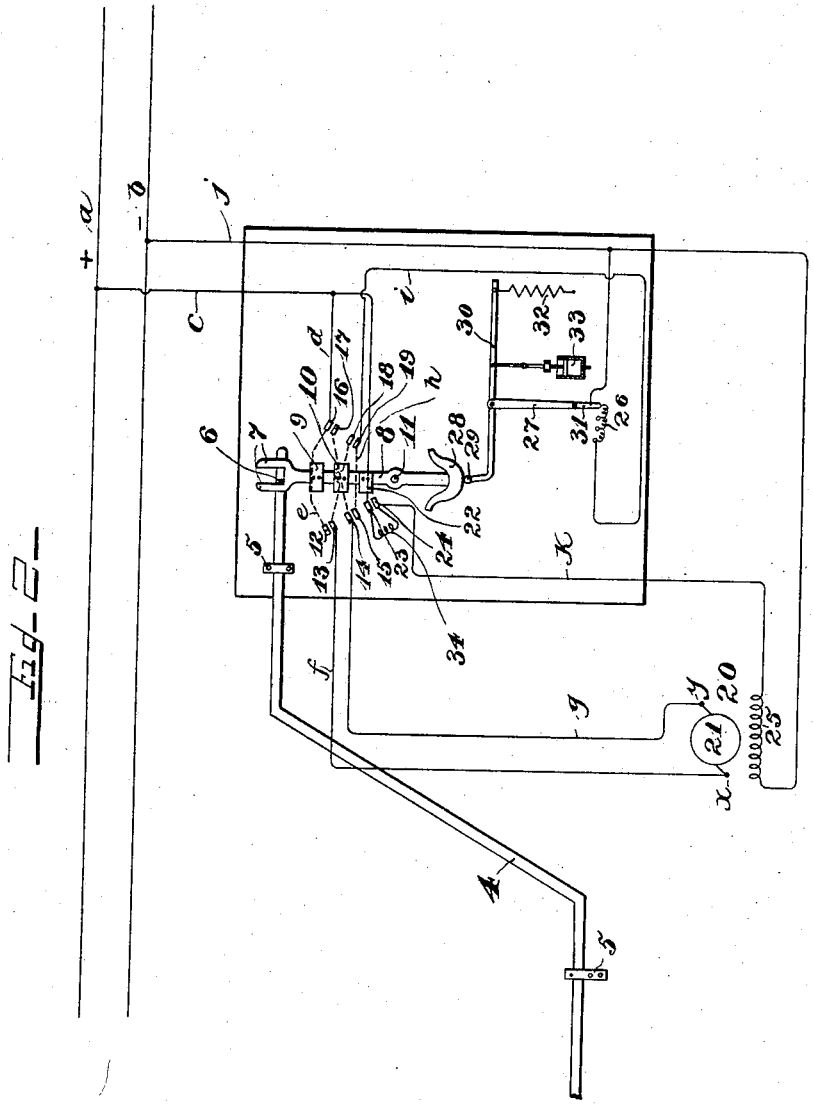

No. 739,005. PATENTED SEPT. 15, 1903.
D. C. JACKSON.
POWER DRIVEN MACHINERY.
APPLICATION FILED FEB. 16, 1903.
NO MODEL. 5 SHEETS—SHEET 3.
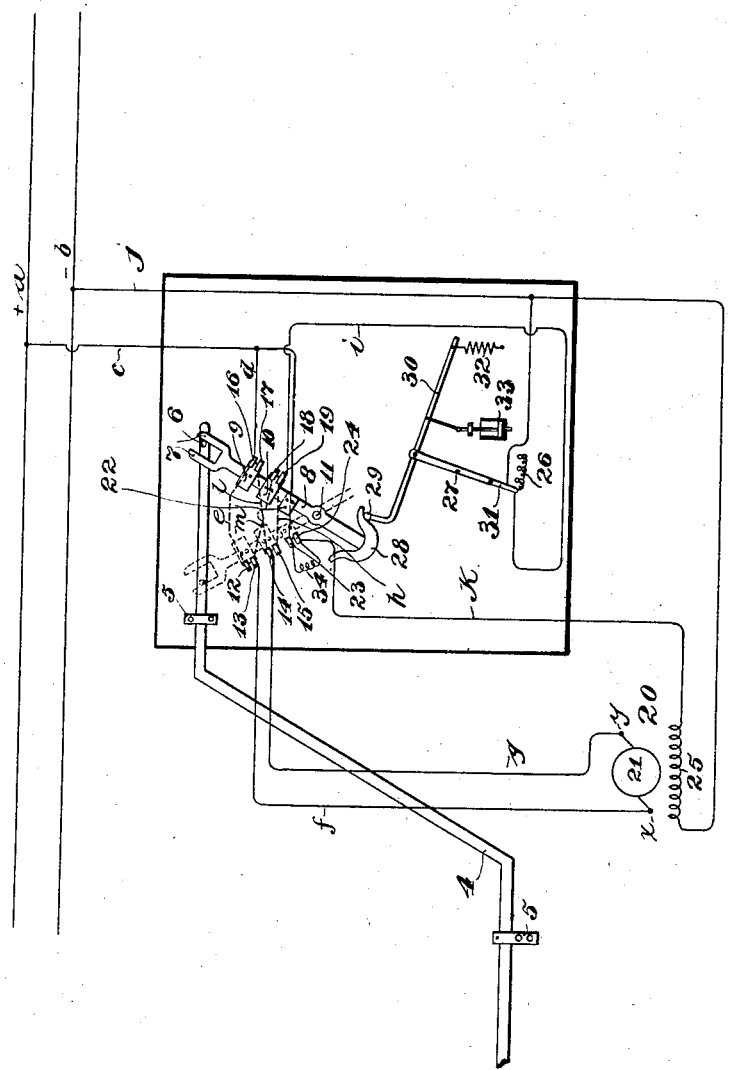
Witnesses:
Leonard W. Novander.
Chas. J. Schmidt.
Inventor:
Dugald C. Jackson
By Charles A. Brown
Attorneys.

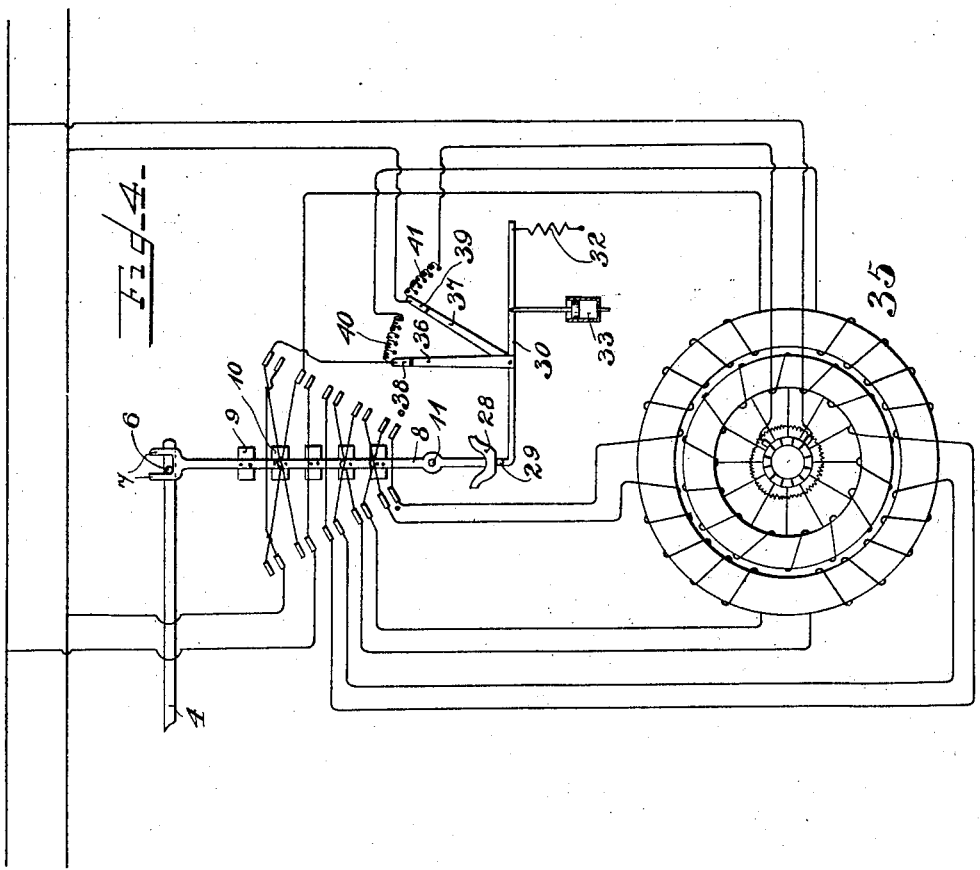

No. 739,005. PATENTED SEPT. 15, 1903.
D. C. JACKSON.
POWER DRIVEN MACHINERY.
APPLICATION FILED FEB. 16, 1903.
NO MODEL. 5 SHEETS—SHEET 5.
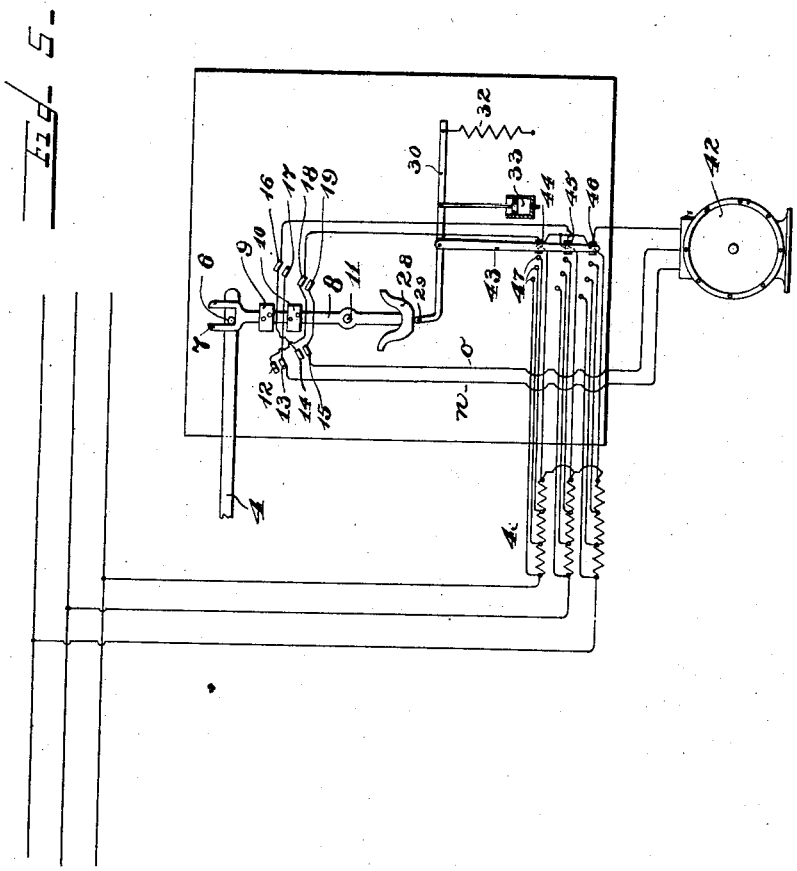
Witnesses:
S. W. Novander
Chas. J. Schmidt
Inventor
Dugald C. Jackson
Charles A. Brown
Attorney No. 739,005.

Patented September 15, 1903.

UNITED STATES PATENT OFFICE.

DUGALD C. JACKSON, OF MADISON, WISCONSIN.

POWER-DRIVEN MACHINERY.

SPECIFICATION forming part of Letters Patent No. 739,005, dated September 15, 1903.

Application filed February 16, 1903. Serial No. 143,503. (No model.)

*To all whom it may concern:*

Be it known that I, DUGALD C. JACKSON, a citizen of the United States, residing at Madison, in the county of Dane and State of Wisconsin, have invented a certain new and useful Improvement in Power-Driven Machinery, (Case No. 16,) of which the following is a full, clear, concise, and exact description, reference being had to the accompanying drawings, forming a part of this specification.

My invention relates to power-driven machinery and to the operation thereof, and particularly to that class of machinery which requires reversal in direction of some moving member. This reversal in direction of motion may be mechanically accomplished—as, for example, by automatically throwing into and out of engagement forward or reverse clutches by means well known to those skilled in the art.

The object of my invention is to electrically accomplish this reversal of direction, and preferably by the employment of reversing-motors, making my invention particularly adaptable in establishments where the multiple-unit system of electric-power transmission is employed.

By means of my invention I am enabled to accomplish a reversal in direction of motion much more flexibly and gently and with less strain to operative parts than is possible where mechanical devices are employed.

As a planer offers one of the best examples of machines employing a reversing member, for the sake of illustration I have shown as applied to such machine my invention, which will be more clearly explained by reference to the accompanying drawings, in which—

Figure 1 shows a motor in driving connection with a planer. Fig. 2 is a diagrammatic view of devices and circuits employed in accordance with my invention, the driving-motor being of the simple direct-current shunt-wound type and at rest. Fig. 3 shows the switch in reverse position, the motor being in motion. Fig. 4 shows a modification, the motor being of the alternating-current-induction type. Fig. 5 shows another modification, the motor being of the alternating-current type.

Like characters of reference indicate like parts throughout the several figures.

In Fig. 1 I have shown dogs 1 and 2 adjustably attached to the planer-bed 3 of a planer and arranged to come in contact with and to reciprocate an actuating-bar 4, adapted to slide in ways 5 5. A pin 6, rigidly connected to actuating-bar 4, engages prongs 7 7 of the fork-shaped extremity of a switch-arm 8, carrying blades 9 10, insulated therefrom, said arm 8 being pivoted at 11 and adapted to oscillate about said pivot 11 when actuating-bar 4 is moved in a lateral direction, thus causing switch-blades 9 10 to engage and short-circuit switch-contacts 12 13 and 14 15, respectively, or, in a reverse position, 16 17 and 18 19, respectively. These switch-blades and contacts, with the necessary connections, form a reversing-switch to the terminals of driving-motor 20. I preferably also employ a starting resistance 26, preferably adapted to be automatically and gradually cut out of the motor-circuit. To accomplish this, I preferably terminate the lower extremity of the switch-arm 8 in a cam 28, so shaped that upon oscillation of arm 8 said cam is adapted to so engage one end 29 of a lever 30 that a contact 31 on a rheostat-arm 27, rigidly attached at the fulcrum of said lever 30, will be allowed to travel over the terminals of resistance 26. Lever 30 and rheostat-arm 27 may move under the actuation of a spring 32, controlled by a dash-pot 33, as shown, or by other well-known devices.

To start the machine, it is only necessary for the operator to move the actuating-bar 4, and with it the switch-arm 8, far enough to bring the switch-arm to the "forward" position, as shown by dotted lines in Fig. 3. At the instant the switch closes cam 28 will be so disposed as to allow end 29 of lever 30 to travel along the face thereof, thus permitting contact 31 to successively and gradually engage the various resistance-terminals, thereby cutting resistance out of the armature-circuit and permitting armature 21 to start without an injurious or undue flow of current, especially when the direction of rotation is to be reversed. The dash-pot 33 and spring 32 may be adjustable, so that the rate of acceleration of the motor may be controllable.

With the switching device in forward position, as shown by dotted lines in Fig. 3, currents from positive supply-main $a$ will flow as follows: from supply-main $a$ through conductor $c$, conductor $d$, contact 16, conductor $e$, contact 12, switch-blade 9, contact 13, conductor $f$ to the terminal $x$ of armature 21 through said armature, conductor $g$, contact 14, switch-blade 10, contact 15, conductor $h$, contact 19, conductor $i$, resistance 26, conductor $j$ back to the negative supply-main $b$. At the same time current will flow from main $a$ through the conductor $c$, contact 23, switch-blade 22, contact 24, conductor $k$, field-winding 25 and back through conductor $j$ to main $b$. Motor 20 and the planer-bed 3 driven thereby thus move in a forward direction. At the end of the forward stroke of the planer-bed 3 dog 1 and actuating-bar 4 will be in relative position, (shown in Fig. 1,) and switch-arm 8 will be in a corresponding position. (Shown in full lines in Fig. 3.) Current will now flow as follows: from the positive main $a$ through conductor $c$, conductor $d$, contact 16, blade 9, contact 17, conductor $l$, contact 14, conductor $g$ to the terminal $y$ of armature 21, and back through conductor $f$, contact 13, conductor $m$, contact 18, blade 10, contact 19, conductor $i$, resistance 26, and through conductor $j$ to negative main $b$. At the same time current will flow from main $a$ through conductor $c$, contact 23, resistance 34, (hereinafter mentioned,) contact 24, conductor $k$, field-winding 25, and back through conductor $j$ to negative main $b$. The motor and planer-bed 3 will thus run in a reverse direction. At the end of the reverse stroke dog 2 will engage bar 4 to pull the switch-arm 8 back to the forward dotted position. Thus a very simple and efficient controlling means is provided for reversing direction of travel in machines of the class mentioned.

It is often desirable in machines of the class referred to to operate at different rates of speed, respectively, on the forward and return strokes, the return stroke commonly being at a higher speed. For this purpose I preferably employ an additional switch-blade 22 and switch-terminals 23 24, to be engaged and short-circuited by said switch-blade. I preferably connect across terminals 23 24 an additional field resistance 34, adapted to be directly included in the circuit with the field-winding 25. Thus when switch-arm 8 is in the forward position this additional resistance is short-circuited by the switch-blade 22 and the driving-motor runs at a slow working speed. With the switch-arm in the reverse position the blade 22 is withdrawn, the resistance becomes effective, and the motor runs at an increased reverse speed.

Figs. 2 and 3 show the field-switch connected with a direct-current shunt-wound machine. When the motor is a direct-current series-wound machine, the field-switch may be arranged to shunt a portion of the field-windings, thus diverting the current therefrom. In this case the motor will operate at its lower speed with the field-switch open and at its higher speed with the field-switch closed.

Since the ratio of the forward to the reverse speed may be considerable, (in modern practice with large planers being as great as one to four) the necessary weakening of the motor field which is required to gain the higher speed is likely to produce sparking unless means for prevention are applied. With the arrangement which I describe it is therefore preferable to use a motor with coils for compensating the armature reactions—such, for instance, as I describe in my application, Serial No. 119,269, filed August 11, 1902.

Although I have described my invention with reference to a direct-current motor, alternating-current or induction motors may also be effectively employed.

In Fig. 4 I have shown as a driving means an alternating-current induction-motor 35. I here preferably employ several sets of reversing-switch mechanism operated in a similar manner as hereinbefore described, one set causing an alternate reversal of current flow through the field-winding of the motor, thereby to reverse the direction of rotation, and other sets alternately changing the number of poles in the field-winding to thus effect a difference between the forward and reverse speeds. As shown in Fig. 4, the number of poles is alternately changed from two to four, although other ratios may be employed. I preferably also employ a lever 30, supporting two arms 36 and 37, operated as hereinbefore described, said arms carrying contacts 38 and 39, adapted to travel over the terminals of resistances 40 and 41, resistance 41 being adapted for inclusion in the main field-circuit and resistance 41 being preferably adapted to be connected in circuit with the brushes. Upon the operation of lever 30 motor 35 is gradually started and the speed gradually increased.

Instead of using resistance as a controlling means when an alternating-current motor is employed an autotransformer may be introduced into the primary circuit of the motor. In Fig. 5 I have shown an alternating-current motor 42 employed as a driving means and also the necessary reversing-switch mechanism, which should preferably be arranged to reverse a pair of conductors—as, for instance, conductors $n$ and $o$, leading to the field-winding of motor 42. A lever 30, operated as hereinbefore described, supports an arm 43, carrying blades 44, 45, and 46, adapted to travel over terminal buttons 47, whereby upon the operation of lever 30 an autotransformer 48 is gradually introduced into the primary circuit to motor 42, whereby said motor is gradually started and brought to full speed. A means similar to that described in connection with Fig. 4 may be employed to establish a ratio of forward to reverse speed.

Although in Fig. 4 I have shown the field and the armature-windings connected in independent branches of the main circuit, it is evident that they may also be connected in series relation.

I have thus described my invention, but do not wish to be limited to the precise construction and arrangement as herein shown, as modifications may readily be made without departing from the spirit of the invention, and I therefore claim as new and desire to secure by Letters Patent—

1. In electric-motor-driven machinery, the combination with a moving member thereof, of means controlled by the position of said member whereby the electric motor driving said machinery is controlled to alternate the direction of motion of said moving member, and means whereby the forward and reverse speeds of said motor may be caused to differ from each other, substantially as described.

2. In electric-motor-driven machinery, the combination with a moving member thereof, of switching means adapted to be controlled by the position of said member whereby the electric motor driving said machinery is controlled to alternate the direction of motion of said moving member, and means whereby the forward and reverse speeds of said motor and said member may be caused to differ from each other, substantially as described.

3. In electric-motor-driven machinery, the combination with a moving member thereof, of switching means, the operation of said switching means being controlled by the position of said member to change the connections of said motor to alternate the direction of rotation thereof, and to vary the resistance of the field-circuit of said motor, thereby to cause a difference between the forward and reverse speeds of said motor and said member, substantially as described.

4. In combination, an electric motor, machinery driven thereby, a moving member of said machinery, switching means controlled and operated by the motion of said member alternately to reverse the direction of a supply-current through the armature of said motor and alternately to increase and decrease the resistance of the field-circuit of said motor to cause a difference between the forward and reverse speeds of said motor and of said member, substantially as described.

5. In combination, an electric motor, machinery driven thereby, a moving member of said machinery, means controlled by the position of said member whereby the electric driving-motor is gradually connected into a supply-circuit, and means whereby said motor is controlled to alternate the direction of motion of said moving member, substantially as described.

6. In combination, an electric motor, machinery driven thereby, a moving member of said machinery, and means controlled by the position of said member whereby the electric driving-motor is gradually connected into a supply-circuit, whereby said motor is controlled to alternate the direction of motion of said moving member, and whereby the forward and reverse speeds may be caused to differ from each other, substantially as described.

7. In combination, an electric motor, machinery driven thereby, a moving member of said machinery, switch-blades, and switch-terminals suitably connected to a current-supply source and to the electric driving-motor, said blades being adapted to be controlled by the position of said moving member to engage said switch-terminals to change the electrical connections thereby to alternate the direction of motion of said motor and said member and to cause a difference between the forward and reverse speeds of said motor, substantially as described.

8. In combination, an electric motor, machinery driven thereby, a moving member of said machinery, a switch-arm, switch-blades, and switch-terminals suitably connected to a current-supply circuit and to said motor, said arm being adapted to be operated by the position of said member to carry said blades to engage said switch-terminals to reverse the direction of current therethrough, whereby the direction of motion of said motor and said moving member may be alternated, and of controlling means operatively associated with said member whereby said motor may be gradually connected into said supply-circuit, substantially as described.

9. In combination, an electric motor, machinery driven thereby, a moving member of said machinery, a switch-arm, switch-blades, and switch-terminals suitably connected to a current-supply circuit and to said motor, said arm being adapted to be operated by the position of said member to carry said blades to engage said switch-terminals to reverse the direction of current therethrough, whereby the direction of motion of said motor and said moving member may be alternated, of controlling means operatively associated with said switch-arm whereby said motor may be gradually connected into said supply-circuit, and of further means operatively associated with said switch-arm whereby the forward and reverse speeds may be caused to differ from each other, substantially as described.

10. In combination, an electric motor, machinery driven thereby, a moving member of said machinery, switch-arm and switch-blades, said arm being adapted to be operated by said member to carry said blades to alternately engage two sets of switch-terminals suitably connected to a current-supply source and to the electric driving-motor whereby to change connections of said motor to alternate the direction of motion thereof and of said moving member, and whereby resistance may alternately be cut out of and into the field-circuit thereby to cause the forward and reverse speeds to be different from each other, substantially as described.

11. In combination, an electric motor, machinery driven thereby, a moving member of said machinery, switch mechanism controlled by the position of said member to govern the operative condition of said motor, cam mechanism also controlled by the position of said member, rheostat mechanism coöperating with said cam mechanism, and means whereby said rheostat mechanism may be controlled to gradually start said motor, substantially as described.

12. In combination, an electric motor, machinery driven thereby, a moving member of said machinery, a switch-arm controlled by the position of said moving member to engage switch-terminals whereby to control the operative condition of said motor, cam mechanism controlled by the position of said member, and rheostat mechanism coöperating with said cam mechanism and governed thereby to cause current to be gradually supplied to said motor, substantially as described.

13. In combination, an electric motor, machinery driven thereby, a moving member of said machinery, a switch-arm controlled by the position of said moving member to engage switch-terminals whereby to control the operative condition of said motor, cam mechanism associated with said switch-arm, a rheostat resistance, a rheostat-lever, the actuation of said lever being controlled by the position of said cam mechanism, and means whereby said rheostat-lever may be actuated to gradually cut said resistance out of circuit thereby to allow current to be gradually supplied to said motor, substantially as described.

14. In combination, an electric motor, machinery driven thereby, a moving member of said machinery, a switch-arm controlled by the position of said moving member to engage switch-terminals whereby to control the operative condition of said motor, cam mechanism associated with said switch-arm, a rheostat resistance, a rheostat-lever, the actuation of said lever being controlled by the position of said cam mechanism, means for actuating said lever to engage said resistance, and means whereby the motion of said lever may be retarded whereby said resistance is gradually cut out of circuit thereby to allow current to be gradually supplied to said motor, substantially as described.

15. In combination, an electric motor, machinery driven thereby, a moving member of said machinery, switch mechanism controlled by the position of said member to govern the operative condition of said motor, cam mechanism also controlled by the position of said member, rheostat mechanism coöperating with said cam mechanism, spring mechanism for actuating said rheostat mechanism, and dash-pot mechanism whereby the actuation of said rheostat mechanism may be retarded to gradually start said motor, substantially as described.

16. In a device of the class described, the combination with a moving member, of switching means adapted to be controlled by the position of said member, an electric motor for driving said moving member, means controlled by said switching means for causing reciprocation of said moving member, and means whereby said electric motor is gradually connected with a supply-circuit, substantially as described.

17. In a device of the class described, the combination with a moving member, of switching mechanism adapted to be controlled by the position of said member, an electric motor for driving said moving member, reversing mechanism controlled by said switching mechanism for causing a reciprocation of said moving member, and means whereby the electric motor is gradually connected with a supply-circuit.

18. In a device of the class described, the combination with a moving member thereof, of switching means adapted to be controlled by the position of said member, an electric motor for driving said member, means controlled by said switching means for causing a reciprocation of said moving member, and means for causing the forward and reverse speeds to differ from each other, substantially as described.

19. In a device of the class described, the combination with a moving member thereof, of switching mechanism adapted to be controlled by the position of said member, an electric motor for driving said moving member, reverse mechanism controlled by said switching mechanism for causing a reciprocation of said moving member, and means for causing the forward and reverse speeds of said motor to differ from each other, substantially as described.

20. In a device of the class described, the combination with a moving member thereof, of switching mechanism adapted to be controlled by the position of said member, an electric motor for driving said moving member, reverse mechanism controlled by said switching mechanism for causing a reciprocation of said moving member, means for causing the forward and reverse speeds to differ from each other, and means whereby the electric motor is gradually connected with a supply-current, substantially as described.

21. In a device of the class described, the combination with a moving member thereof, of switching mechanism adapted to be controlled by the position of said member, an electric motor for driving said moving member, reverse mechanism controlled by said switching mechanism for causing a reciprocation of said moving member, means for causing the forward and reverse speeds to differ from each other, and rheostat mechanism controlled by said switching mechanism whereby said motor may be gradually connected with a supply-circuit, substantially as described.

In witness whereof I hereunto subscribe my name this 14th day of February, A. D. 1903.

DUGALD C. JACKSON.

Witnesses:
HARVEY L. HANSON,
CHARLES J. SCHMIDT.